United States Patent
Tomihashi et al.

(10) Patent No.: US 7,208,227 B2
(45) Date of Patent: Apr. 24, 2007

(54) ETFE LINING MEMBER

(75) Inventors: Nobuyuki Tomihashi, Settsu (JP); Hiroshi Torii, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 274 days.

(21) Appl. No.: 10/504,168

(22) PCT Filed: Jan. 28, 2003

(86) PCT No.: PCT/JP03/00785

§ 371 (c)(1),
(2), (4) Date: Aug. 11, 2004

(87) PCT Pub. No.: WO03/068499

PCT Pub. Date: Aug. 21, 2003

(65) Prior Publication Data

US 2005/0147826 A1     Jul. 7, 2005

(30) Foreign Application Priority Data

Feb. 12, 2002   (JP)   ............... 2002-034126

(51) Int. Cl.
B32B 15/08    (2006.01)
B32B 18/00    (2006.01)
B32B 27/06    (2006.01)

(52) U.S. Cl. ............ 428/411.1; 428/421; 428/457; 428/473.5; 428/702

(58) Field of Classification Search ............... 428/212, 428/411.1, 421, 473.5, 457, 702
See application file for complete search history.

(56) References Cited

U.S. PATENT DOCUMENTS 5,177,126 A * 1/1993 Moore et al. ............... 523/458
5,194,336 A   3/1993 Yamada
5,705,017 A   1/1998 Sakamoto et al.
5,849,829 A * 12/1998 Buegman ................... 524/449

FOREIGN PATENT DOCUMENTS

| EP | 0 433 872 A2 | 6/1991 |
| EP | 894541 A1 | 2/1999 |
| JP | 56-77142 A | 6/1981 |
| JP | 7-290637 A | 11/1995 |
| JP | 2000-107690 | 4/2000 |
| JP | 2001-219122 A | 8/2001 |
| KR | 1993-0009293 | 9/1993 |
| WO | WO 93/11935 A1 | 6/1993 |
| WO | WO 94/29101 A1 | 12/1994 |
| WO | WO 95/21216 A1 | 8/1995 |

OTHER PUBLICATIONS

MatWeb Material Data Sheet for ETFE, Jul. 2006.*
International Search Report for PCT/JP03/00785 dated Jun. 10, 2003.

* cited by examiner

Primary Examiner—Ramsey Zacharia
(74) Attorney, Agent, or Firm—Sughrue Mion, PLLC

(57) ABSTRACT

The present invention provides a lining member in which an ETFE is used and which shows good adhesion and can show a reduction in coating film defects. An ETFE-lining member comprising a substrate, a primer layer and a surface layer laminated in this order, wherein said substrate comprises a metal or a ceramic, said primer layer comprises an ETFE (A) and a binder component, and said surface layer comprises an ETFE (B) having fluorine content higher than that of the ETFE (A).

4 Claims, No Drawings

ETFE LINING MEMBER

TECHNICAL FIELD

The present invention relates to a lining member in which an ethylene/tetrafluoroethylene-based copolymer is used and which is high in adhesion strength and has few coating film defects.

BACKGROUND ART

Apparatus for chemical or medical use and piping materials in semiconductor manufacturing plants, among others, are generally contacted to chemicals and the like on the occasion of use thereof and, therefore, are desired to be resistant to chemicals and the like and to corrosion. When the substrates constituting such apparatus, piping materials and so forth are protected by a corrosion-resistant lining, for instance, they can be provided with corrosion resistance.

Among the lining members each provided with a lining, there are ones in which fluororesins, in particular ethylene/tetrafluoroethylene copolymers [ETFEs], are utilized since they are easier to handle as compared with the conventional glass linings and have good resistance to chemicals such as acids, alkalis, oxidizing and reducing agents and various solvents.

When used for lining members, ETFEs are applied generally in the form of coatings such as powder coatings and, in this case, primers to be applied beforehand, as undercoats, to substrates are generally regarded as unnecessary, hence are not used. ETFEs are now in wide use in view of such simplicity in using them.

ETFE-based coatings comprising an ETFE are applied to articles to be coated and then baked for forming s coating film. Generally, the resulting films are desired to have a certain thickness in terms of being provided with corrosion resistance. In electrostatic coating processes, for instance, the steps of application and baking at a high temperature are repeated several times.

While ETFEs are by nature excellent in chemical resistance, among others, they are poor in adhesion to substrates and, therefore, when they are applied in the form of coatings to give relatively thick films, there arises a problem that the coatings may develop coating film defects such as cracks.

The formation of cracks results in a decrease in corrosion resistance. For avoiding cracking, it is impossible to increase the film thickness, hence the corrosion resistance has to remain poor. Thus, any ETFE-lining member satisfactory in corrosion resistance has not been obtained as yet.

Although ETFEs are excellent in heat resistance and show a certain degree of adhesiveness just after application thereof as coatings, their adhesiveness decreases under severe conditions, such as hot water or high temperature conditions, to cause problems, namely coating film defects, such as cracks in coating films and peeling of f from articles coated therewith.

ETFE-based coatings are sometimes applied to articles to be coated, which comprise chromium-containing metals such as stainless steels. Since chromium-containing metals promote the decomposition of ETFEs, there are problems on the application of the coating to articles to be coated.

To solve such problems and effectively use ETFE-based coatings, primer development has become desired. As a primer for ETFE-based coatings, there are known PPS-based primers comprising polyphenylene sulfide [PPS] and a polyamideimide resin.

However, no solvent is available for dissolving such PPS-based primers, hence these occur as solids. It is difficult to apply them onto articles to be coated evenly and uniformly and, as a result, voids between the primer and the substrate are readily occurred, resulting in peeling. Thus, they are incapable of completely solving the insufficient adhesion and coating film defect problems mentioned above.

ETFEs are generally high in alternating-copolymer character, the mole ratio between ethylene and tetrafluoroethylne is 1:1, and the fluorine content is 59.4% by mass. However, ETFEs higher in fluorine content for improving in gloss, transparency and flame retardancy have been desired for recent years. When the fluorine content is high, the adhesion to substrates is weak and, accordingly, coating film defects tend to appear. The demand for improvement in adhesion is thus increasing.

SUMMARY OF THE INVENTION

In view of the above-discussed state of the art, it is an object of the present invention to provide a lining member in which an ETFE is used and which shows good adhesion and can show a reduction in coating film defects.

The present invention provides an ETFE-lining member comprising a substrate, a primer layer and a surface layer laminated in this order, wherein said substrate comprises a metal or a ceramic, said primer layer comprises an ETFE (A) and a binder component, and said surface layer comprises an ETFE (B) having fluorine content higher than that of the ETFE (A).

DETAILED DISCLOSURE OF THE INVENTION

In the following, the present invention is described in detail.

The ETFE-lining member comprises a substrate, a primer layer and a surface layer laminated in this order.

The above primer layer comprises an ETFE (A) and a binder component.

The primer layer is a coating film formed by applying a primer composed of the ETFE (A) and the binder component to the substrate, followed by drying.

In the above primer, the ETFE (A) contained in the primer differs in surface tension from the binder component and, therefore, the ETFE (A) rises toward the surface in the step of baking for surface layer formation, which is to be described later herein, so that the ETFE (A) is disposed mainly on the surface side remote from the substrate, showing good adhesion to the surface layer comprising ETFE (B) owing to the compatibility therebetween, while the binder component is disposed mainly on the substrate side, so that it can show good adhesion to the substrate.

In this specification, the term "ETFE (A)" means a copolymer obtained by polymerizing mainly ethylene and tetrafluoroethylene and intended for incorporation in the above-mentioned primer. In this specification, a copolymer obtained by polymerizing mainly ethylene and tetrafluoroethylene is sometimes referred to also as "ETFE-based copolymer". The ETFE-based copolymer may be a copolymer obtained by polymerizing ethylene and tetrafluoroethylene alone or a copolymer obtained by polymerizing ethylene and tetrafluoroethylene plus a small proportion of another monomer.

Preferably, the ETFE (A) is a product obtained by copolymerization of ethylene and tetrafluoroethylene, together with other fluorine-containing monomers for the purpose of crystallinity controlling. The other fluorine-containing monomers as mentioned above are not particularly restricted but may be any of those capable of adding to both of ethylene and tetrafluoroethylene. Fluorine-containing vinyl monomers containing 3 to 8 carbon atoms, such as hexafluoroisobutylene and $CH_2=CFC_3F_6H$, are easy to use. The other fluorine-containing monomers as mentioned above preferably amount to not more than 5 mole percent relative to all the monomers constituting the ETFE (A) so that they may not impair the chemical resistance and heat resistance, among others.

The ETFE (A) preferably has a fluorine content of not lower than 50% by mass. As levels less than 50% by mass, deteriorations in heat resistance and chemical resistance will result. The fluorine content of the ETFE (A) may be not more than 70% by mass if it is within the above range. A more preferred lower limit thereto is 60% by mass. The ETFE (A) can have a fluorine content within the above range as a result of appropriate adjustment of the proportions of ethylene, tetrafluoroethylene and the other monomers to be used when desired. The fluorine content referred to above is the value obtained by burning the fluororesin, causing the fluorine contained therein to be absorbed in an aqueous solution of an alkali or the like and assaying the same by ion chromatography, for instance.

Preferably, the ETFE (A) has a melt flow rate [MFR] of 0.1 to 100 g/10 minutes. When the MFR is within the above range, the meltability of the ETFE (A) becomes adequate for improving the adhesion thereof to the above-mentioned surface layer. When the MFR is less than 0.1 g/10 minutes, the adhesion between the primer layer and the surface layer tends to decrease and, at levels exceeding 100 g/10 minutes, cracking due to stress or stress cracking will easily occur, possibly leading to deterioration in corrosion resistance. A more preferred lower limit is 0.5 g/10 minutes, and a more preferred upper limit is 50 g/10 minutes. In this specification, the "MFR" referred to above is the value obtained by carrying out measurements under a load of 5 kg at 297° C. according to ASTM D 3159.

Preferred as the above ETFE (A) is one having an average particle size of 0.1 to 30 µm. When the size is smaller than 0.1 µm, the primer layer tends to undergo cracking, hence the film thickness tends to be thin and restricted. When it exceeds 30 µm, no uniformity of dispersion will be attained, hence the adhesion to the surface layer will become uneven, resulting in poor adhesion. A more preferred lower limit is 0.2 µm, and a more preferred upper limit is 25 µm. A still more preferred lower limit is 0.5 µm, and a still more preferred upper limit is 20 µm. In this specification, the average particle diameter is the value obtained by carrying out measurements using a laser diffraction/scattering type particle size measuring apparatus.

The ETFE (A) is obtained by polymerization using any of the polymerization methods known in the art, for example the emulsion polymerization technique. If desired, the ETFE powder obtained by polymerization is pulverized so as to have an average particle diameter within the range mentioned above. The method of pulverization is not particularly restricted but any of the methods known in the art, for example the method disclosed in Japanese Kokai Publication Sho-63-270740, can be used. Thus, there may be mentioned, for example, the method comprising compressing the ETFE powder to a sheet-like form by means of a roll, followed by pulverization by means of a pulverizer for classification.

The above-mentioned primer layer comprises a binder component in addition to the above ETFE (A). The binder component is a component capable of functioning as a binder in the formation of the primer layer and it is preferably a heat-resistant resin since such resin can resist baking temperatures for forming the surface layer to be described later herein. In this specification, the term "heat resistant" means the property that enables continuous use at temperatures not lower than 150° C.

The heat-resistant resin is preferably a solvent-soluble resin capable of being dissolved in a solvent. The solvent-soluble resin is important in being dissolved in a solvent and spreading as the binder component all over the substrate surface for improving adhesion. The solvent-soluble resin is not particularly restricted but more preferably is a polyamideimide resin, a polyethersulfone and/or a polyimide resin. These may be used singly or in combination of two or more species. Still more preferred from the adhesion viewpoint is a nitrogen atom-containing resin such as a polyamideimide resin or a polyimide resin.

The solvent capable of making the above solvent-soluble resin dissolved therein is not particularly restricted but one having a boiling point of not lower than 100° C. is preferred because of the ease of evaporation in the step of drying following primer application as described later herein. As such solvent, there may be mentioned N-methyl-2-pyrrolidone, N,N-dimethylacetamide and N,N-dimethylformamide, among others.

The solvent for making the solvent-soluble resin dissolved therein is preferably contained in an amount not less than 10% by mass of the solvent-soluble resin on the solid matter mass basis. In levels less than 10% by mass, it is impossible to spread the solvent-soluble resin all over the substrate, therefore the adhesion is likely to be deficient. A content of not less than 50% by mass is more preferred. As the amount of the solvent increases, the adhesion to the substrate tends to improve.

The ETFE (A) preferably amounts to 50 to 90% relative to the sum of the ETFE (A) and binder component. At levels lower than 50%, interlayer peeling tends to occur between the resulting primer layer and the surface layer and, at levels exceeding 90%, the content of the binder component becomes too low and the adhesion of the resulting primer layer to the substrate will deteriorate. A more preferred lower limit is 60%, and a more preferred upper limit is 80%.

In this specification, the term "solid matter mass basis" means that calculations are made based on the dry solid matter. Therefore, as for the ETFE (A), for instance, the mass percentage thereof on the solid matter basis is 50 to 90% of the sum of the mass of the solid matter of the ETFE (A) and the mass of the solid matter of the binder component.

Thus, preferably, the ETFE (A) amounts to 50 to 90% of the sum of the ETFE (A) and the binder component on the solid matter mass basis and the ETFE (A) has a fluorine content of not lower than 50% by mass. The ETFE-lining member of the present invention can be obtained as one whose primer layer has good adhesion to both the substrate and the surface layer by using such ETFE (A).

The primer for obtaining the primer layer may comprise a heat stabilizer. By adding a heat stabilizer, it becomes possible to prevent a resin such as the ETFE (A) from undergoing oxidation and other thermal degradation in the step of baking for surface layer formation as described later herein; as a result, the stability of interlayer adhesion of the resulting primer layer to the substrate and to the surface layer can be improved.

The heat stabilizer is not particularly restricted but preferably is a metal oxide, an amine type antioxidant and/or an organic sulfur compound.

The metal oxide is not particularly restricted but includes, among others, oxides of Cu, Al, Fe, Co, and Zn.

The amine type antioxidant is preferably an aromatic amine since stability at high temperatures not lower than 250° C. is required. The aromatic amine is not particularly restricted but preferably is a phenyl and/or naphthyl group-containing amine derivative, in terms of excellent heat resistance. As such amine derivative, there may be mentioned, for example, dinaphthylamine, phenyl-α-naphthylamine, phenyl-β-naphthylamine, diphenyl-p-phenylenediamine, and phenylcyclohexyl-p-phenylenediamine.

The organic sulfur compound is not particularly restricted but includes, among others, mercaptobenzimidazole compounds, mercaptobenzothiazole compounds and thiocarbamic acids and salts thereof, and thiuram monosulfides. The above-mentioned salts are not particularly restricted but include salts with Zn, Sn, Cd, Cr, Fe and the like.

The heat stabilizer may be used by singly or in combination of two or more species.

When to be used in the pharmaceutical, semiconductor or like field where the elution of metal ions is undesirable, in particular, the heat stabilizer is preferably a nonmetal compound leaving no residue, including amine type antioxidants and organic sulfur compounds other than metal salts.

The heat stabilizer is preferably used in an amount of 0.001 to 5% on the mass basis relative to the solid matter content of the ETFE (A). At levels below 0.001%, the thermal stabilization effect may be unsatisfactory in some instances and, at levels exceeding 5%, the influence of foaming resulting from decomposition of the heat stabilizer becomes great, resulting in poor adhesion in certain instances. A more preferred lower limit is 0.003%, and a more preferred upper limit is 2%.

The primer layer and/or primer mentioned above may comprise an additive, according to need, in combination with the components mentioned above. The additive is not particularly restricted but includes those generally used in primers for coating, for instance. Thus, it may be a pigment. The pigment is not particularly restricted but includes, among others, color pigments such as carbon, titanium oxide, red iron oxide and mica, rust preventive pigments, and calcined pigments.

Preferably, the primer further contains a dispersion medium. When the binder component and ETFE (A) are dispersed as dispersoids in the dispersion medium mentioned above to give a disperse system (dispersion), the primer can be spread all over the substrate. When the binder component is a soluble resin soluble in a solvent, the solvent-soluble resin dissolved in the solvent constitutes the dispersoid.

The dispersion medium is not particularly restricted but includes, among others, water, alcohols, ketones, esters, and aromatic hydrocarbons. These may be used singly or in combination of two or more species. Among them, water is preferred from the working environment viewpoint.

When water is used as the dispersion medium, a surfactant is required for dispersing the ETFE (A). The surfactant is not particularly restricted but includes, for example, nonionic, anionic and cationic surfactants. It may be used singly or in combination of two or more species. The surfactant is preferably one capable of evaporating or decomposing at relatively low temperatures around 250° C. A rust preventive is preferably incorporated, when water is used as the dispersion medium or for the substrate may be prevented from being corroded on the occasion of coating. The rust preventive is not particularly restricted but may be dibutylamine, for instance.

When water is employed as the dispersion medium, the ETFE (A) obtained by emulsion polymerization may be used in a dispersion form without isolating the resin component. In this case, the water used in emulsion polymerization may be used as the above dispersion medium, or water may be further added, or the surfactant used in emulsion polymerization may be used as such, or a surfactant may be further added. When the ETFE (A) is obtained by suspension polymerization as well, the solvent used in suspension polymerization may be used as the above dispersion medium provided that it falls within the above-mentioned range of dispersion medium.

The primer can be prepared by any of the methods known in the art, for instance. Thus, it can be prepared in the form of a coating by incorporating the pigment, viscosity modifier, film-forming material, solvent and so forth. After dispersion of these materials in optional proportions, the coating may be adjusted to a viscosity facilitating application thereof with a viscosity modifier or the like.

The pigment is used in a form pulverized and dispersed in a pulverizer/disperser, such as a basket mill, dynamo mill or ball mill, together with the above-mentioned water, binder component, surfactant, etc.

When it is of a dispersion type, the ETFE (A) has a relatively small average particle diameter of about 0.5 μm and, therefore, can be dispersed as such in the above-mentioned primer. As the dispersion type ETFE (A), use is generally made of one produced by emulsion polymerization and concentrated with the surfactant mentioned above. When the ETFE (A) is used in a powder form with an average particle diameter of 1 to 30 μm, the powder is wetted with the dispersion medium by using the above surfactant and then mixed with the binder component.

When water is used as the dispersion medium, the same or nearly the same volume of the binder component as that of the pigment is used and pulverized and dispersed beforehand in water, followed by mixing up with the other components of the primer. The heat stabilizer mentioned above is preferably added on the occasion of pigment pulverization because of the convenience from the production viewpoint.

The surface layer comprises the ETFE (B).

The surface layer is a coating film formed by applying a coating for surface layers comprised of the ETFE (B) onto the primer layer, followed by drying, if necessary, and by baking.

In this specification, the term "ETFE (B)" means a copolymer obtained by polymerizing ethylene and tetrafluoroethylene as main comonomers and intended to be incorporated in the coating for surface layers. The ETFE (B) is thus conceptually distinguished from the ETFE (A), which is incorporated in the primer, in that it is incorporated in the coating for surface layers.

The ETFE (B) has a fluorine content not lower than the fluorine content of the ETFE (A). In this specification, that "the ETFE (B) has a fluorine content not lower than the fluorine content of the ETFE (A)" means that the fluorine content value (b) of the ETFE (B) to be used is equal to or greater than the fluorine content value (a) of the ETFE (A) to be used. Thus, that "the ETFE (B) has a fluorine content not lower than the fluorine content of the ETFE (A)" refers to the case of comparing the fluorine contents of a copolymer actually employed in the ETFE-lining member of the present invention between copolymers belonging to the category of "ETFE (B)" and copolymers belonging to the category of "ETFE (A)".

As mentioned hereinabove, the ETFE (A) preferably has a fluorine content of not lower than 50% by mass, and the fluorine content may be not higher than 70% by mass provided that it is within the above range, while, as described later herein, the ETFE (B) preferably has a fluorine content of 50 to 70% by mass. Therefore, the respective preferred fluorine content ranges of ETFE (A) and ETFE (B) may be said to coincide with each other. The fluorine contents of the copolymers actually used in the ETFE-lining member of the present invention are desirably within those preferred ranges in ETFE (A) and ETFE (B) respectively and namely the above-defined (a) and (b), the fluorine contents of the copolymers actually used satisfy the relation (a)≦(b).

Owing to the use of the ETFE (A) and ETFE (B) having such respective fluorine contents, the ETFE-lining member of the present invention can be obtained as one excellent in interlayer adhesion between the primer layer and the surface layer. If the fluorine content of the ETFE (B) is lower in value than the fluorine content of the ETFE (A), the interlayer adhesion between the primer layer and, due to surface tension, the surface layer will be low, resulting in coating film defects; this is unfavorable.

The ETFE (B) preferably has a fluorine content of 50 to 70% by mass. When the ETFE (B) to be used in the surface layer has a fluorine content within the above range, the ETFE-lining member of the present invention can be obtained as one not only improved in corrosion resistance, flame retardancy and other surface characteristics but only excellent in appearance. From the corrosion resistance viewpoint, a more preferred lower limit to the fluorine content of the ETFE (B) is 60% by mass and, from the gloss, transparency and flame retardancy viewpoint, a still more preferred lower limit thereto is 62% by mass and a more preferred upper limit is 68% by mass. When the fluorine content of the ETFE (B) is within the above range, the ETFE-lining member of the present invention can show the above-mentioned excellent surface characteristics and appearance as well as the good adhesion between the primer layer and the surface layer.

The ETFE (B) is not particularly restricted but may be any one satisfying the above-mentioned fluorine content, in particular having the fluorine content thereof not lower than that of the ETFE (A). Thus, for example, it may be one obtained by copolymerizing ethylene and tetrafluoroethylene, together with other fluorine-containing monomers, like in the case of the ETFE (A). The other fluorine-containing monomers are as described hereinabove referring to the ETFE (A) and preferably amount to not more than 5 mole percent of the all monomers in the ETFE (B).

The method of producing the above ETFE (B) is not particularly restricted but may be, for example, the same as the method for the ETFE (A), and the fluorine content thereof can be adjusted by the same method as that for the ETFE (A).

The coating for surface layers is not particularly restricted provided that it comprises the ETFE (B) having a fluorine content not lower than the fluorine content of the ETFE (A), as mentioned above. From rendering the ETFE-lining member of the present invention excellent not only in surface characteristics, such as corrosion resistance and flame retardancy, but also in appearance characteristics, such as colorlessness and transparency, however, it is preferred that the composition does not contain the binder component mentioned hereinabove. When the binder component is incorporated therein, the ETFE (B) content in the surface layer lowers and, thus, the surface characteristics may deteriorate and/or decomposition occurs upon heating in the baking step to cause discoloration.

The coating for surface layers may contain, in addition to the ETFE (B), other components, such as additive, each in an appropriate amount according to need.

The other components are preferably used each in a minimal amount in terms of fully making use of the characteristics of the ETFE (B), such as corrosion resistance. By minimizing the amounts of the other components, it becomes possible to increase the purity of the ETFE (B) in the surface layer, and the surface layer can be inhibited from adversely affecting water, chemical or other substances coming into contact therewith in semiconductor manufacturing equipment, chemical or medical appliances, for instance, and from being deteriorated.

The coating for surface layers may take the form of a water-based coating, solvent-based coating or powder coating, for instance. From the environmental protection viewpoint, however, a water-based coating and powder coating are preferred and, from the possibility of increasing the film thickness, a powder coating is more preferred.

The powder coating preferably has an average powder particle diameter of 10 to 1,000 μm. When that diameter is smaller than 10 μm, electrostatic coating becomes difficult and, when it exceeds 1,000 μm, the smoothness tends to become worse as at using in the manner of rotolining. The average particle diameter of the above powder particles is selected according to the intended purpose and generally, in the case of a powder coating for forming thin coats which is to give a dry film thickness of not more than 100 μm, it is preferably 20 to 40 μm and, in the case of a powder coating for forming thick coats, it is preferably 40 to 80 μm. In the case of a powder coating for rotolining, it is preferably 200 to 500 μm.

The water-based coating and solvent-based coating mentioned above can be produced by the same method as mentioned above for the production of the primer.

The method of producing the above-mentioned powder coating is not particularly restricted but may be any of the methods known in the art, for instance. Thus, for example, use may be made of the method comprising melt-kneading the ETFE (B) and the other component(s) mentioned above according to need, followed by pulverizing, and the method comprising pulverization and classification in the same manner as described above referring to the method of pulverizing the ETFE (A). The method described referring to the ETFE (A) is preferred. The powder coating can be adjusted to an average particle diameter adequate for the method of coating application and the film thickness by such a method of pulverization.

The ETFE-lining member of the present invention comprises the primer layer and the surface layer laminated on the substrate.

The substrate comprises a metal or a ceramic.

The metal is not particularly restricted but includes, among others, iron; stainless steel such as SUS 304, SUS 316L and SUS 403; aluminum; and plated steel sheets, such as zinc-plated and aluminum-plated steel sheets. The ceramic is not particularly restricted but may be any of heat-resistant ceramics, including, for example, earthenware, porcelain, alumina materials, zirconia materials, and silicon oxide materials.

The substrate is not particularly restricted but may be any substrate generally desired to be provided with a lining comprising an ETFE-based copolymer. For example, a substrate desired to be provided with corrosion resistance is preferred. As such substrate, there may be mentioned, among others, tanks, vessels, columns, valves, pumps, joints, other piping members, and like members to be provided with a corrosion-resistance lining; chemical or medical appliances, wafer baskets, coil bobbin tower packing materials, valves for chemicals, pump impellers, and other members to be provided with corrosion resistance.

If necessary, the substrate may be subjected to such pretreatment as cleaning or surface roughening. Preferably, the substrate is subjected to such pretreatment as mentioned above in terms of improving the adhesion to the primer layer and preventing the surface layer from deteriorating. As the pretreatment, there may be mentioned, for example, the removal of oils from the substrate by using a solvent or cleaning agent or by burning off by baking, for instance; chemical etching by using hydrochloric acid, sulfuric acid or an alkali, for instance; the oxide removal from the substrate surface or rendering the surface uneven for an increase in surface area by blast treatment with silica sand, an alumina powder or the like. It is also possible to cover the material with a ceramic or like material by thermal spraying after blast treatment and apply the above primer thereto.

The ETFE-lining member of the present invention can be produced by applying the above-mentioned primer to the above-mentioned substrate and drying to form a primer layer, applying the coating for surface layers mentioned above to the primer layer, followed by drying if necessary and by baking for the formation of the surface layer.

The method of applying the primer to the substrate is not particularly restricted. When the primer is in a liquid form, there may be mentioned such a per se known method as spray coating, dipping, or electrostatic coating. The application can be carried out so that the film thickness after drying may preferably amount to 5 to 200 µm. A more preferred lower limit is 10 µm, a more preferred upper limit is 100 µm, and a still more preferred upper limit is 50 µm.

The drying after the above primer application is carried out, for example, at 80 to 200° C. for 10 to 60 minutes. The above drying may be carried out at room temperature prior to heating and the heating conditions can be rendered milder.

The method of applying the coating for surface layers is not particularly restricted. When it occurs as a liquid, for example in the case of a water-based coating, a solvent-based coating or the like, namely when it occurs as a dispersion, a slurry type one or the like, there may be mentioned the spray coating, roller coating or like technique and, in the case of a powder coating, there may be mentioned the electrostatic spray coating, fluidized bed dipping coating and rotolining techniques, among others. The rotolining technique is preferred as the application method in viewpoint of easily increasing the film thickness and easily reducing the time of application.

The baking is carried out generally at 260 to 320° C. for 20 to 60 minutes although it is not particularly restricted but it may be carried out at a temperature higher than the melting points, softening points or glass transition points of the above-mentioned ETFE (A) and ETFE (B) at which temperature the above-mentioned ETFE (A), ETFE (B), the binder component and the optionally incorporated heat stabilizer will not be decomposed. When the rotolining technique is employed as the method of applying the coating for surface layers, the surface layer formation and baking are carried out simultaneously.

The surface layer preferably has a film thickness of 100 to 10,000 µm after the above baking. If the thickness is less than 100 µm, the excellent characteristics of the corrosion-resistant ETFE (B) is not fully made of use in some cases, in particular in the case of corrosion-resistant linings. When it exceeds 10,000 µm, cracking, among others, may occur. A more preferred upper limit is 5,000 µm.

The ETFE-lining member of the present invention, in which the primer layer comprising the binder component and ETFE (A) is laminated between the substrate and the surface layer comprising ETFE (B), is excellent in adhesion between the substrate and primer layer owing to the binder component and shows good interlayer adhesion between the primer layer and the surface layer owing to the compatibility between the ETFE (A) and ETFE (B).

Furthermore, the ETFE-lining member of the present invention, in which the fluorine content of the ETFE (B) is not lower than that of the ETFE (A), is firm in interlayer adhesion between the primer layer and the surface layer. In this manner, the ETFE-lining member of the present invention is excellent in adhesion between the substrate and primer layer and in adhesion between the primer layer and the surface layer and, therefore, no failure in adhesion will occur and such coating film defects as blistering and coating film peeling can be reduced.

Therefore, the ETFE-lining member of the present invention can suitably be used as a corrosion-resistant lining member, for instance. As for the fields of application of such corrosion-resistant lining member, there may be mentioned, for example, the semiconductor manufacture field, including semiconductor manufacturing apparatus, apparatus for producing chemicals for semiconductor manufacture, and containers for chemicals for semiconductor manufacture; the chemical and medical fields, including drug manufacturing apparatus, containers for drugs, chemicals producing apparatus, and containers for chemicals; and the foodstuff field, including alcohol fermentation vessels, vessels for brewing fermented foodstuffs, and containers for storing fermented foodstuffs.

BEST MODES FOR CARRYING OUT THE INVENTION

The following examples illustrate the present invention in more detail. These examples are, however, by no means limitative of the scope of the present invention.

PREPARATION EXAMPLE 1

An amount of 30 g of an ETFE powder, namely an ethyene/tetrafluoroethylene/$CH_2=CFC_3F_6H$ copolymer (fluorine content 50.4% by mass) having a melt flow rate at 297° C. of 8 g/10 minutes and an average particle diameter of 10 µm, was used as the ETFE (A), and 10 g of a PAI powder, namely a pulverized polyamideimide (PAI, product of Hitachi Chemical) having an average particle diameter of 1.5 µm, was used as the binder component. They were placed in a stainless steel vessel, together with 0.7 g of a surfactant (trademark: Nonion HS-208; product of NOF Corporation), 0.1 g of dibutylamine and 25 g of pure water. After 20 minutes of stirring at 300 rpm using a propeller stirrer, 20 g of N-methyl-2-pyrrolidone was further dispersed therein with stirring to give a primer.

PREPARATION EXAMPLE 2

An amount of 30 g of an ETFE powder, namely an ethyene/tetrafluoroethylene/$CH_2=CFC_3F_6H$ copolymer (fluorine content 60.4% by mass) having a melt flow rate at 297° C. of 15 g/10 minutes and an average particle diameter of 12 µm, was used as the ETFE (A), and 10 g of a PAI powder, namely a pulverized polyamideimide (PAI, product of Hitachi Chemical) having an average particle diameter of 1.5 µm, was used as the binder component. They were placed in a stainless steel vessel, together with 0.5 g of a surfactant (trademark: Nonion HS-208; product of NOF Corporation), 0.1 g of dibutylamine and 5 g of pure water. After 20 minutes of stirring at 300 rpm using a propeller stiffer, 20 g of N-methyl-2-pyrrolidone was further dispersed therein with stirring to give a primer.

PREPARATION EXAMPLE 3

An amount of 30 g of an ETFE powder, namely an ethyene/tetrafluoroethylene/$CH_2=CFC_3F_6H$ copolymer (fluorine content 66.6% by mass) having a melt flow rate at 297° C. of 8 g/10 minutes and an average particle diameter of 10 μm, was used as the ETFE (A), and 10 g of a PAI powder, namely a pulverized polyamideimide (PAI, product of Hitachi Chemical) having an average particle diameter of 1.5 μm, was used as the binder component. They were placed in a stainless steel vessel, together with 0.7 g of a surfactant (trademark: Nonion HS-208; product of NOF Corporation), 0.1 g of dibutylamine and 25 g of pure water. After 20 minutes of stirring at 300 rpm using a propeller stiffer, 20 g of N-methyl-2-pyrrolidone was further dispersed therein with stirring to give a primer.

PREPARATION EXAMPLE 4

A primer was prepared in the same manner as in Preparation Example 2 except that 24 g of the ETFE powder and 16 g of the PAI powder were used.

PREPARATION EXAMPLE 5

A primer was prepared in the same manner as in Preparation Example 1 except that a PI powder, namely a pulverized polyimide (PI, product of Hitachi Chemical) having an average particle diameter of 2.5 μm, was used in lieu of the PAI powder.

PREPARATION EXAMPLE 6

A primer was prepared in the same manner as in Preparation Example 2 except that the ETFE powder having an average particle diameter of 4.8 μm was used.

PREPARATION EXAMPLE 7

A primer was prepared in the same manner as in Preparation Example 2 except that 15 g of the ETFE powder and 25 g of the PAI powder were used.

EXAMPLE 1

A substrate comprising SUS 304 was degreased using acetone and blast-treated at a pressure of 0.5 MPa using a #60 alumina powder (Tosa Emery) in a sandblasting apparatus. The primer obtained in Preparation Example 1 was applied to this substrate to a dry film thickness of 30 μm and, after 15 minutes of drying at 120° C., a powder coating comprising an ethyene/tetrafluoroethylene/$CH_2=CFC_3F_6H$ copolymer (fluorine content 60.4% by mass) having a melt flow rate at 297° C. of 15 g/10 minutes and an average particle diameter of 75 μm was applied as ETFE (B) to a film thickness after baking of 150 μm, followed by 30 minutes of baking at 290° C. Thereafter, the above powder coating was repeatedly applied three times in the manner of electrostatic coating. Thus was obtained an ETFE-lining member with a film thickness of 550 μm after baking.

EXAMPLE 2

A substrate comprising SUS 304 was degreased using acetone and blast-treated at a pressure of 0.5 MPa using a #60 alumina powder (Tosa Emery) in a sandblasting apparatus. The primer, obtained in Preparation Example 2 was applied to this substrate to a dry film thickness of 35 μm and, after 15 minutes of drying at 120° C., a powder coating comprising an ethyene/tetrafluoroethylene/$CH_2=CFC_3F_6H$ copolymer (fluorine content 60.4% by mass) having a melt flow rate at 297° C. of 15 g/10 minutes and an average particle diameter of 75 μm was applied as ETFE (B) to a film thickness after baking of 170 μm, followed by 30 minutes of baking at 290° C. Thereafter, the above powder coating was repeatedly applied three times in the manner of electrostatic coating. Thus was obtained an ETFE-lining member with a film thickness of 580 μm after baking.

EXAMPLE 3

A substrate comprising SUS 304 was degreased using acetone and blast-treated at a pressure of 0.5 MPa using a #60 alumina powder (Tosa Emery) in a sandblasting apparatus. The primer obtained in Preparation Example 2 was applied to this substrate to a dry film thickness of 25 μm and, after 15 minutes of drying at 120° C., a powder coating comprising an ethyene/tetrafluoroethylene/$CH_2=CFC_3F_6H$ copolymer (fluorine content 66.6% by mass) having a melt flow rate at 297° C. of 48 g/10 minutes and an average particle diameter of 73 μm was applied as ETFE (B) to a film thickness after baking of 200 μm, followed by 30 minutes of baking at 290° C. Thereafter, the above powder coating was repeatedly applied three times in the manner of electrostatic coating. Thus was obtained an ETFE-lining member with a film thickness of 600 μm after baking.

EXAMPLE 4

A substrate comprising SUS 304 was degreased using acetone and blast-treated at a pressure of 0.5 MPa using a #60 alumina powder (Tosa Emery) in a sandblasting apparatus. The primer obtained in Preparation Example 3 was applied to this substrate to a dry film thickness of 30 μm and, after 15 minutes of drying at 120° C., a powder coating comprising an ethyene/tetrafluoroethylene/$CH_2=CFC_3F_6H$ copolymer (fluorine content 66.6% by mass) having a melt flow rate at 297° C. of 8 g/10 minutes and an average particle diameter of 73 μm was applied as ETFE (B) to a film thickness after baking of 170 μm, followed by 30 minutes of baking at 290° C. Thereafter, the above powder coating was repeatedly applied three times in the manner of electrostatic coating. Thus was obtained an ETFE-lining member with a film thickness of 560 μm after baking.

EXAMPLE 5

A substrate comprising SUS 304 was degreased using acetone and blast-treated at a pressure of 0.5 MPa using a #60 alumina powder (Tosa Emery) in a sandblasting apparatus. The primer obtained in Preparation Example 4 was applied to this substrate to a dry film thickness of 30 μm and, after 15 minutes of drying at 120° C., a powder coating comprising an ethyene/tetrafluoroethylene/$CH_2=CFC_3F_6H$ copolymer (fluorine content 66.6% by mass) having a melt flow rate at 297° C. of 8 g/10 minutes and an average particle diameter of 73 μm was applied as ETFE (B) to a film thickness after baking of 150 μm, followed by 30 minutes of baking at 290° C. Thereafter, the above powder coating was repeatedly applied three times in the manner of electrostatic coating. Thus was obtained an ETFE-lining member with a film thickness of 550 µm after baking.

EXAMPLE 6

A substrate comprising SUS 304 was degreased using acetone and blast-treated at a pressure of 0.5 MPa using a #60 alumina powder (Tosa Emery) in a sandblasting apparatus. The primer obtained in Preparation Example 5 was applied to this substrate to a dry film thickness of 35 µm and, after 15 minutes of drying at 120° C., a powder coating comprising an ethyene/tetrafluoroethylene/$CH_2=CFC_3F_6H$ copolymer (fluorine content 66.6% by mass) having a melt flow rate at 297° C. of 8 g/10 minutes and an average particle diameter of 73 µm was applied as ETFE (B) to a film thickness after baking of 150 µm, followed by 30 minutes of baking at 290° C. Thereafter, the above powder coating was repeatedly applied three times in the manner of electrostatic coating. Thus was obtained an ETFE-lining member with a film thickness of 580 µm after baking.

EXAMPLE 7

A substrate comprising SUS 304 was degreased using acetone and blast-treated at a pressure of 0.5 MPa using a #60 alumina powder (Tosa Emery) in a sandblasting apparatus. The primer obtained in Preparation Example 6 was applied to this substrate to a dry film thickness of 35 µm and, after 15 minutes of drying at 120° C., a powder coating comprising an ethyene/tetrafluoroethylene/$CH_2=CFC_3F_6H$ copolymer (fluorine content 66.6% by mass) having a melt flow rate at 297° C. of 8 g/10 minutes and an average particle diameter of 73 µm was applied as ETFE (B) to a film thickness after baking of 170 µm, followed by 30 minutes of baking at 290° C. Thereafter, the above powder coating was repeatedly applied three times in the manner of electrostatic coating. Thus was obtained an ETFE-lining member with a film thickness of 560 µm after baking.

COMPARATIVE EXAMPLE 1

A substrate comprising SUS 304 was degreased using acetone and blast-treated at a pressure of 0.5 MPa using a #60 alumina powder (Tosa Emery) in a sandblasting apparatus. The primer obtained in Preparation Example 3 was applied to this substrate to a dry film thickness of 30 µm and, after 15 minutes of drying at 120° C., a powder coating comprising an ethyene/tetrafluoroethylene/$CH_2=CFC_3F_6H$ copolymer (fluorine content 50.4% by mass) having a melt flow rate at 297° C. of 15 g/10 minutes and an average particle diameter of 75 µm was applied as ETFE (B) to a film thickness after baking of 150 µm, followed by 30 minutes of baking at 290° C. Thereafter, the above powder coating was repeatedly applied three times in the manner of electrostatic coating. Thus was obtained an ETFE-lining member with a film thickness of 550 µm after baking.

COMPARATIVE EXAMPLE 2

A substrate comprising SUS 304 was degreased using acetone and blast-treated at a pressure of 0.5 MPa using a #60 alumina powder (Tosa Emery) in a sandblasting apparatus. The primer obtained in Preparation Example 3 was applied to this substrate to a dry film thickness of 30 µm and, after 15 minutes of drying at 120° C., a powder coating comprising an ethyene/tetrafluoroethylene/$CH_2=CFC_3F_6H$ copolymer (fluorine content 60.4% by mass) having a melt flow rate at 297° C. of 15 g/10 minutes and an average particle diameter of 70 µm was applied as ETFE (B) to a film thickness after baking of 200 µm, followed by 30 minutes of baking at 290° C. Thereafter, the above powder coating was repeatedly applied three times in the manner of electrostatic coating. Thus was obtained an ETFE-lining member with a film thickness of 590 µm after baking.

Primer Adhesiveness Testing

The coating films of the ETFE-lining members obtained in Examples 1 to 7 and Comparative Examples 1 and 2 were each provided with parallel grooves with a spacing of 10 mm using a knife and subjected to peel testing at an angle of 90 degrees on an autograph at a speed of 50 mm/minute. Separately, the ETFE-lining members obtained were immersed in boiling water at 95° C. for 20 hours or subjected to 72 hours of annealing in an oven at 200° C. and then subjected to peel testing under the same conditions. The results are shown in Table 1.

TABLE 1

| | Primer layer | | | Surface layer | Adhesion strength (kg/cm) | | |
| --- | --- | --- | --- | --- | --- | --- | --- |
| | ETFE (A) Fluorine content (mass %) | Binder component species | ETFE(A)/ binder component | ETFE (B) Fluorine content (mass %) | Initial | After hot water treatment (95° C. × 20 hrs) | After annealing (200° C. × 72 hrs) |
| Ex. 1 | 50.4 | PAI | 75/25 | 60.4 | 14.5 | 13.8 | 11.8 |
| Ex. 2 | 60.4 | PAI | 75/25 | 60.4 | 13.1 | 12.8 | 11.6 |
| Ex. 3 | 60.4 | PAI | 75/25 | 66.6 | 15.3 | 14.5 | 13.2 |
| Ex. 4 | 66.6 | PAI | 75/25 | 66.6 | 14.6 | 14.2 | 13.3 |
| Ex. 5 | 60.4 | PAI | 60/40 | 66.6 | 13.5 | 13.0 | 11.2 |
| Ex. 6 | 50.4 | PI | 75/25 | 66.6 | 12.7 | 12.1 | 12.2 |
| Ex. 7 | 60.4 | PAI | 75/25 | 66.6 | 15.1 | 14.3 | 11.6 |
| Comparative Ex. 1 | 66.6 | PAI | 75/25 | 50.4 | 3.6 | 1.3 | 1.3 |
| Comparative Ex. 2 | 66.6 | PAI | 75/25 | 60.4 | 6.8 | 3.1 | 1.5 |

As seen in Table 1, it was found that the adhesion or bond strength is weak in Comparative Examples 1 and 2 in which the fluorine content of the ETFE-based copolymer in the powder coating is lower than the fluorine content of the ETFE powder in the primer, whereas the adhesion is excellent in Examples 1 to 7 in which the fluorine content of the ETFE-based copolymer is not lower than the fluorine content of the ETFE powder.

In Table 1, the mass ratios between the ETFE (A) and binder component are shown. It was found that the adhesion is very strong in Examples 1 to 7 in which the ETFE (A) is within the range of 50 to 90% of the sum of the ETFE (A) and binder component on the solid matter mass basis.

INDUSTRIAL APPLICABILITY

The ETFE-lining member of the present invention, which has the constitution described hereinabove, is excellent in adhesion between the substrate and primer layer and in adhesion between the primer layer and the surface layer and, thus, can be obtained as one with a reduced coating film defects.

The invention claimed is:

1. An ETFE-lining member comprising a substrate, a primer layer and a surface layer laminated in this order,
    wherein said substrate comprises a metal or a ceramic,
    said primer layer comprises an ETFE (A) and a binder component, and said surface layer comprises an ETFE (B) having fluorine content of 66.6 to 68% by mass, said fluorine content being not lower than that of said ETFE (A).

2. The ETFE-lining member according to claim 1,
    wherein the ETFE amounts to 50 to 90% of the sum of the ETFE and the binder component on the solid matter mass basis and said ETFE (A) has a fluorine content of not lower than 50% by mass.

3. The ETFE-lining member according to claim 1,
    wherein the ETFE has a melt flow rate of 0.1 to 100 g/10 minutes.

4. The ETFE-lining member according to claim 1,
    wherein the binder component is a polyamideimide resin, a polyethersulfone and/or a polyimide resin.

* * * * *